(12) United States Patent
Isozumi et al.

(10) Patent No.: US 9,600,702 B2
(45) Date of Patent: Mar. 21, 2017

(54) IMAGE PROCESSING SYSTEM AND ASSISTANCE SYSTEM

(71) Applicant: FUJI MACHINE MFG. CO., LTD., Chiryu (JP)

(72) Inventors: Joji Isozumi, Nagakute (JP); Nobuyuki Nakane, Toyota (JP); Hideaki Nomura, Toyota (JP)

(73) Assignee: FUJI MACHINE MFG. CO., LTD., Chiryu (JP)

( * ) Notice: Subject to any disclaimer, the term of this patent is extended or adjusted under 35 U.S.C. 154(b) by 0 days.

(21) Appl. No.: 14/764,443

(22) PCT Filed: Jan. 31, 2013

(86) PCT No.: PCT/JP2013/052251
§ 371 (c)(1),
(2) Date: Jul. 29, 2015

(87) PCT Pub. No.: WO2014/118956
PCT Pub. Date: Aug. 7, 2014

(65) Prior Publication Data
US 2015/0363627 A1 Dec. 17, 2015

(51) Int. Cl.
*G06K 9/00* (2006.01)
*G06K 7/14* (2006.01)
(Continued)

(52) U.S. Cl.
CPC ....... *G06K 7/1456* (2013.01); *G06K 7/10722* (2013.01); *G06K 7/10801* (2013.01); *G06K 9/00* (2013.01); *G06K 19/06131* (2013.01)

(58) Field of Classification Search
CPC .. G06K 1/00; G06K 7/00; G06K 7/10; G06K 7/14; G06K 7/1404; G06K 7/1439;
(Continued)

(56) References Cited

U.S. PATENT DOCUMENTS

2006/0163357 A1 7/2006 Kim et al.
2006/0226229 A1 10/2006 Kim et al.
(Continued)

FOREIGN PATENT DOCUMENTS

EP 2 393 037 A1 12/2011
JP 11-296615 A 10/1999
(Continued)

OTHER PUBLICATIONS

U.S. Appl. No. 14/766,633, filed Aug. 7, 2015, Isozumi, et al.
(Continued)

*Primary Examiner* — Sonji Johnson
(74) *Attorney, Agent, or Firm* — Oblon, McClelland, Maier & Neustadt, L.L.P.

(57) ABSTRACT

An image processing system includes a mark in which an information display portion presenting predetermined information is included in a region formed by a pair of fiducial lines; a camera that is provided to be relatively movable with respect to the mark; an information acquisition unit that acquires the information presented in the information display portion of the mark, out of the image data; a distance calculation unit that calculates a distance from the camera to the mark in an optical axis direction; and an angle calculation unit that calculates a tilt angle of the camera with respect to the mark.

5 Claims, 5 Drawing Sheets

(51) Int. Cl.
*G06K 7/10* (2006.01)
*G06K 19/06* (2006.01)

(58) Field of Classification Search
CPC .. G06K 7/1443; G06K 7/1447; G06K 7/1456; G06K 19/06131; G06K 7/10801; G06K 9/00; G06K 7/10722
See application file for complete search history.

(56) References Cited

U.S. PATENT DOCUMENTS

| | | |
|---|---|---|
| 2006/0231635 A1 | 10/2006 | Kim et al. |
| 2009/0090781 A1 | 4/2009 | Ye et al. |
| 2011/0101101 A1 | 5/2011 | Ye et al. |
| 2011/0290880 A1 | 12/2011 | Cai et al. |
| 2014/0022281 A1* | 1/2014 | Georgeson ............ B64F 5/0045 345/633 |

FOREIGN PATENT DOCUMENTS

| | | |
|---|---|---|
| JP | 2005 63142 | 3/2005 |
| JP | 2005 190327 | 7/2005 |
| JP | 2008 41039 | 2/2008 |
| JP | 2010 179403 | 8/2010 |
| JP | 2012 200406 | 10/2012 |
| WO | WO 2004/040506 A1 | 5/2004 |
| WO | WO 2007/075362 A1 | 7/2007 |

OTHER PUBLICATIONS

Japanese Office Action issued in Application No. 2014-559447 on Jul. 5, 2016 (computer-generated English translation).
Extended Search Report issued Sep. 26, 2016 in European Patent Application No. 13873323.3.
International Search Report Issued Apr. 2, 2013 in PCT/JP2013/052251 Filed Jan. 31, 2013.

* cited by examiner

FIG. 5

| MARK INFORMATION | |
|---|---|
| REGULATION LENGTHS Lp | _ _ . _ |
| REGULATION ANGLE La | 0 |
| CLEARANCE | _ _ . _ |
| PERSONAL INFORMATION | |
| ID | _ _ _ _ _ _ _ _ _ |
| HEIGHT | _ _ _ . _ |
| WEIGHT | _ _ . _ |
| CONTROL INFORMATION | |
| MOVEMENT PATH | typeA |
| APPROACHING SPEED 1 | _ _ . _ |
| APPROACHING SPEED 2 | |
| AID INFORMATION | |
| METHOD OF AID | typeB |
| AID HISTORY | _ _ _ _ _ |
| | |

IMAGE PROCESSING SYSTEM AND ASSISTANCE SYSTEM

TECHNICAL FIELD

The present disclosure relates to an image processing system in which information presented in a mark is acquired through image processing and a position of the mark with respect to a reader is calculated, and an assistance system including the image processing system.

BACKGROUND ART

A two-dimensional code and a bar code are used in various fields such as the production field and the medical field. For example, a mark presenting predetermined information like the two-dimensional code allows the information to be read by performing image processing of image data acquired through image capturing performed by a camera. In a reader which reads information of the mark through such image processing, recognition accuracy of the mark is desired to be improved. In regard thereof, in PTL 1 and PTL 2, a distance between the mark and the reader is measured or calculated so as to correct image controlling of the mark, thereby improving recognition accuracy of the mark.

CITATION LIST

Patent Literature

PTL 1: JP-A-2005-190327
PTL 2: JP-A-2008-41039

SUMMARY

Technical Problem

However, in the configurations of PTL 1 and PTL 2, a sensor device or a light projection device for measuring a distance is necessary in addition to a camera. In regards to reading of information of a mark performed by a reader, including an extension of the readable range or distance, recognition accuracy of the mark is desired to be improved further. Therefore, it is necessary to recognize the positional relationship between the mark and the reader in more detail.

The present disclosure has been made taking the foregoing circumstances into consideration. An objective thereof is to provide an image processing system in which information presented by a mark can be acquired through image processing and information related to a position of a camera with respect to the mark can be acquired, and an assistance system.

Solution to Problem

An image processing system according to the present disclosure includes a mark in which at least a pair of fiducial lines set to regulation lengths are arranged in a parallel manner or at a predetermined angle so as to form a regulation angle, or four or more fiducial points not on the same straight line virtually configuring the pair of fiducial lines are arranged, and an information display portion presenting predetermined information is included in a region formed by the pair of fiducial lines; a camera that is provided to be relatively movable with respect to the mark; an information acquisition unit that acquires image data of the mark through image capturing performed by the camera and acquires the information presented in the information display portion of the mark, out of the image data; a distance calculation unit that calculates a distance from the camera to the mark in an optical axis direction based on the regulation lengths of the pair of fiducial lines and apparent lengths of the pair of fiducial lines in the image data; and an angle calculation unit that calculates a tilt angle of the camera with respect to the mark based on the regulation angle of the pair of fiducial lines and an apparent angle formed by the pair of fiducial lines in the image data.

According to the configuration, in the image processing system, the distance calculation unit calculates the distance from the camera to the mark in the optical axis direction, and the angle calculation unit calculates the tilt angle of the camera with respect to the mark. Accordingly, in the image processing system, the information presented in the mark can be acquired, and the information related to a position of the camera with respect to the mark can be acquired. The information acquisition unit reflects a positional relationship between the mark and the camera in recognition processing of the mark, and thus, recognition accuracy of the mark can be improved.

BRIEF DESCRIPTION OF DRAWINGS

FIG. 5 is a diagram illustrating information acquired through reading of the mark.

DESCRIPTION OF EMBODIMENT

Embodiment

Overall Configuration of Assistance System 1 and Image Processing System 2

Figure 1:
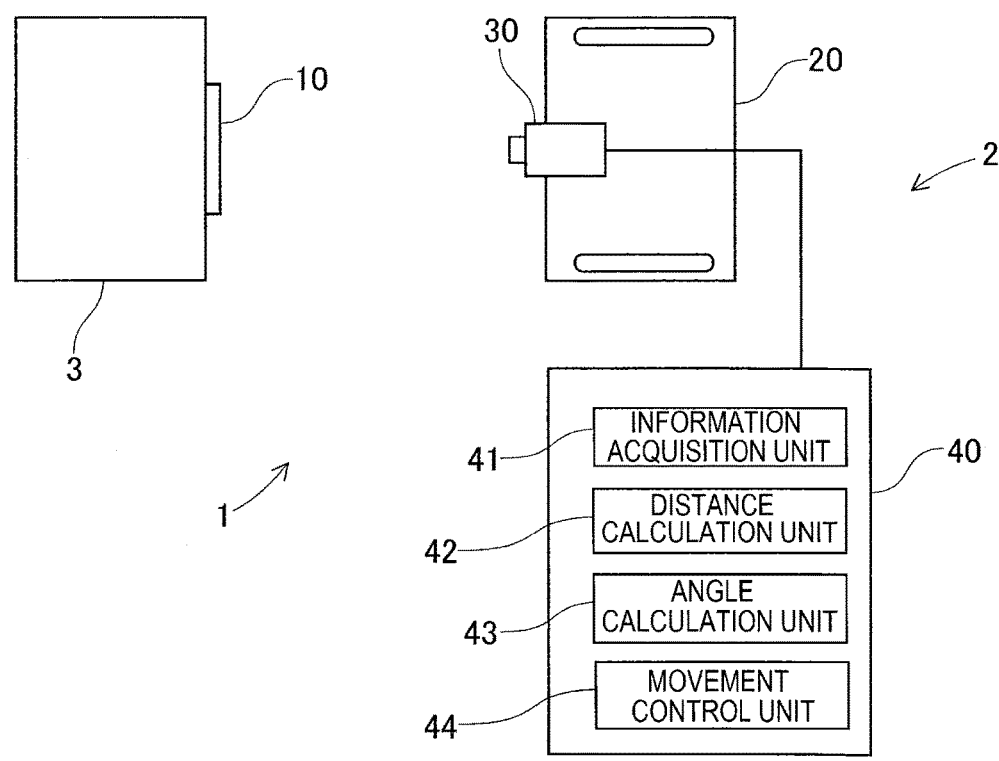
FIG. 1 is a block diagram illustrating an assistance system and an image processing system of an embodiment.

Hereinafter, descriptions will be given regarding an embodiment in which an image processing system and an assistance system of the present disclosure are specified, with reference to the drawings. In the present embodiment, an objective of an assistance system 1 is to support shift motion of an person receiving assistance who needs an aid in motion such as shifting from a sitting posture to a standing posture. As illustrated in FIG. 1, the assistance system 1 includes an image processing system 2 and assistance equipment 3 which corresponds to a chair, a bed, or the like used by the person receiving assistance.

Figure 2:
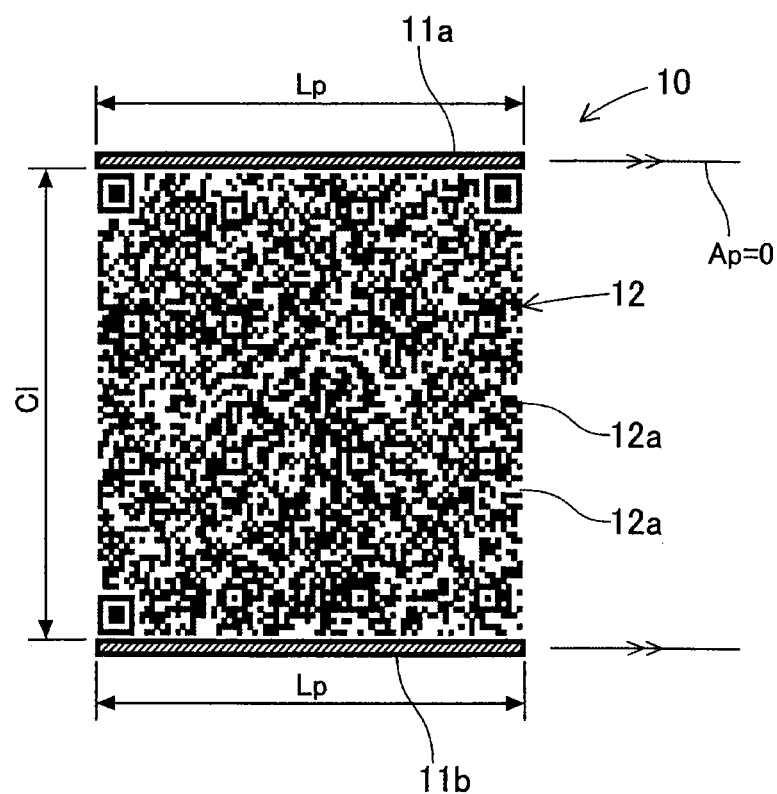
FIG. 2 is a plan view illustrating a mark.

The image processing system 2 includes a mark 10, an assistance apparatus 20, a camera 30, and a control device 40. In the assistance system 1, the image processing system 2 performs processing of image data so as to acquire optical information of the mark 10 and to acquire positional information of the camera 30 with respect to the mark 10. The mark 10 is shaped like a rectangle in overall shape and is pasted on a vertical surface of the assistance equipment 3. As illustrated in FIG. 2, in the mark 10, a pair of fiducial lines 11a and 11b set to have regulation lengths Lp are arranged at a predetermined angle or in a parallel manner so as to form a regulation angle Ap. In the present embodiment, the regulation angle Ap is set to zero degrees (Ap=0), that is, the pair of fiducial lines 11a and 11b are arranged in the parallel manner.

The mark 10 includes a two-dimensional code 12 presenting predetermined information in a region formed by the pair of fiducial lines 11a and 11b. The two-dimensional code 12 in the present embodiment is an information display portion in which a plurality of unit cells 12a are configured to be arrayed in a matrix shape along the fiducial line 11a (11b). In more detail, in the mark 10, the pair of fiducial lines 11a and 11b are arranged in the parallel manner as described above, and the plurality of unit cells 12a are arrayed over a plurality of columns in an extending direction of the fiducial line 11a (11b).

In this manner, the two-dimensional code 12 of the mark 10 presents predetermined information through an array pattern of the plurality of unit cells 12a. In detail, the plurality of unit cells 12a are minimum units of information, are formed to have square shapes, and optically present each data bit in black-and-white density. Hereinafter, the information presented by the two-dimensional code 12 is also referred to as "the optical information." As the two-dimensional code, for example, the QR code (registered trademark) is known. The optical information presented by the two-dimensional code 12 includes control information related to movement controlling of the assistance apparatus 20. The optical information will be described later in detail.

The assistance apparatus 20 is an apparatus which aids motion of the person receiving assistance. The assistance apparatus 20 is provided with a drive device (not illustrated) in a main body section and operates based on a control signal which is transmitted from a movement control unit 44 of the below-described control device 40. Also, the assistance apparatus 20 is configured from a mobile body which moves across the floor by a drive wheel being rotated by a drive device. In particular, the assistance apparatus 20 moves from a current position to the periphery of the assistance equipment 3 in response to a call of the person receiving assistance. Thereafter, the assistance apparatus 20 fixes an arm portion (not illustrated) to the assistance equipment 3 and operates the drive device based on manipulation performed by the person receiving assistance or a signal from various sensors such as a proximity sensor and the like installed in each site. In this manner, the assistance apparatus 20 supports motion of the person receiving assistance.

The camera 30 is a digital camera having an image pick-up device such as a charge coupled device (CCD) or a complementary metal oxide semiconductor (CMOS). As illustrated in FIG. 1, the camera 30 is provided in the assistance apparatus 20, and an optical axis Oa of a lens unit is fixed so as to be parallel to the floor and to be oriented forward from the assistance apparatus 20. In this manner, the camera 30 is provided so as to be relatively movable with respect to the mark 10 attached to the assistance equipment 3. Then, the camera 30 images the front of the assistance apparatus 20 based on the control signal from the transmissibly connected control device 40 and transmits the image data acquired through image capturing thereof to the control device 40.

The control device 40 is mainly configured to include a CPU, various memory units, and a control circuit, and operation of the assistance apparatus 20 is controlled based on the image data acquired through image capturing performed by the camera 30. As illustrated in FIG. 1, the control device 40 includes an information acquisition unit 41, a distance calculation unit 42, an angle calculation unit 43, and the movement control unit 44. The control device 40 is transmissibly connected to the various sensors provided in the assistance apparatus 20 and is connected to an actuator operating the arm portion and the like, via a bus.

The information acquisition unit 41 acquires the image data of the mark 10 through image capturing performed by the camera 30 and acquires the optical information of the image data presented by the two-dimensional code 12 of the mark 10. Specifically, the information acquisition unit 41 first recognizes a portion of the two-dimensional code 12 in the image data and performs mask processing of the portion. Subsequently, the information acquisition unit 41 executes decode processing complying with a standard of the two-dimensional code 12, thereby reading and acquiring the optical information presented in the two-dimensional code 12. At the time of decode processing, the information acquisition unit 41 may decode encoded data, correct an error, or the like. In this manner, the information acquisition unit 41 configures a reader of the mark 10, together with the camera 30.

The distance calculation unit 42 calculates a distance from the camera 30 to the mark 10 in an optical axis direction based on the regulation lengths Lp of the pair of fiducial lines 11a and 11b and the apparent length of the fiducial line 11a (11b) in the image data. Specifically, the distance calculation unit 42 first acquires the regulation length Lp which is stored in the memory unit of the control device 40 in advance or the regulation length Lp which is included in the optical information read by the information acquisition unit 41. Subsequently, the distance calculation unit 42 measures the apparent lengths of the pair of fiducial lines 11a (11b) in the image data.

Here, the apparent length of the fiducial line 11a corresponds to a ratio occupied by the fiducial line 11a in the image data. For example, the apparent length thereof is a length corresponding to the number of pixels necessary to display the target fiducial line 11a, in the image data having a predetermined number of pixels. Therefore, when it is assumed that imaging magnification of the camera 30 is uniform, the apparent length of the fiducial line 11a becomes longer as the camera 30 approaches closer to the mark 10. Then, the distance calculation unit 42 calculates the distance in the optical axis direction based on the acquired regulation length Lp and the measured apparent length, for example, from a relational expression therebetween or a map.

The distance calculation unit 42 calculates a shift amount X of the camera 30 with respect to the mark 10 based on a difference between a fiducial position Pr of the mark 10 deduced from the pair of fiducial lines 11a and 11b in the image data, and a center position Pc of the image data. Here, the shift amount X is a relative distance from the camera 30 to the mark 10 in a direction orthogonal to the optical axis. The shift amount X is a value indicating a shifted degree of the mark 10 from the optical axis Oa in the lens unit of the camera 30.

When calculating the shift amount X, the distance calculation unit 42 first deduces the fiducial position Pr of the mark 10 corresponding to the center (a point where two diagonal lines intersect each other) of a rectangle which is configured with the pair of fiducial lines 11a and 11b in the image data. Subsequently, the distance calculation unit 42 calculates a difference between the fiducial position Pr and the center position Pc of the image data as the number of pixels in the image data, for example. The difference between the fiducial position Pr and the center position Pc varies depending on the distance from the camera 30 to the mark 10. Therefore, the distance calculation unit 42 calculates the shift amount X based on the difference and the calculated distance in the optical axis direction, for example, from a relational expression therebetween or the map.

The angle calculation unit 43 calculates a tilt angle of the camera 30 with respect to the mark 10 based on the regulation angle Ap of the pair of fiducial lines 11a and 11b and an apparent angle formed by the pair of fiducial lines 11a and 11b in the image data. Here, the tilt angle of the camera 30 includes tilts of the optical axis with respect to the planar mark 10 in a horizontal direction and a vertical direction, and a turning angle about the optical axis. When calculating the tilt angle, the angle calculation unit 43 first acquires the regulation angle Ap which is stored in the memory unit of the control device 40 in advance, and the regulation angle Ap which is included in the optical information read by the information acquisition unit 41. Subsequently, the angle calculation unit 43 measures the apparent angle which is formed by the pair of fiducial lines 11a and 11b in the image data.

The apparent angle varies depending on the regulation angle Ap of the pair of fiducial lines 11a and 11b or a tilt direction of the camera 30 with respect to the mark 10. However, for example, if the regulation angle Ap is zero degrees, the apparent angle becomes greater as the tilt angle becomes greater. For example, if extended lines of the pair of fiducial lines 11a and 11b do not intersect each other on the image data, the pair of fiducial lines 11a and 11b are assumed to be parallel to each other, and thus, the apparent angle is measured to be zero degrees. Then, the angle calculation unit 43 calculates the tilt angle of the camera 30 with respect to the mark 10 based on the acquired regulation angle Ap and the measured apparent angle from a relational expression therebetween or the map, for example.

The movement control unit 44 controls movement of the assistance apparatus 20 which is the mobile body. In detail, the movement control unit 44 transmits a control signal to the actuator and the like of the drive wheel or the arm portion based on the control information acquired by the information acquisition unit 41, and a detection value from various sensors provided in the assistance apparatus 20. Accordingly, the movement control unit 44 controls the movement of the assistance apparatus 20, and a support operation for the person receiving assistance.

Acquisition of Optical Information Through Image Processing System 2

Figure 3:
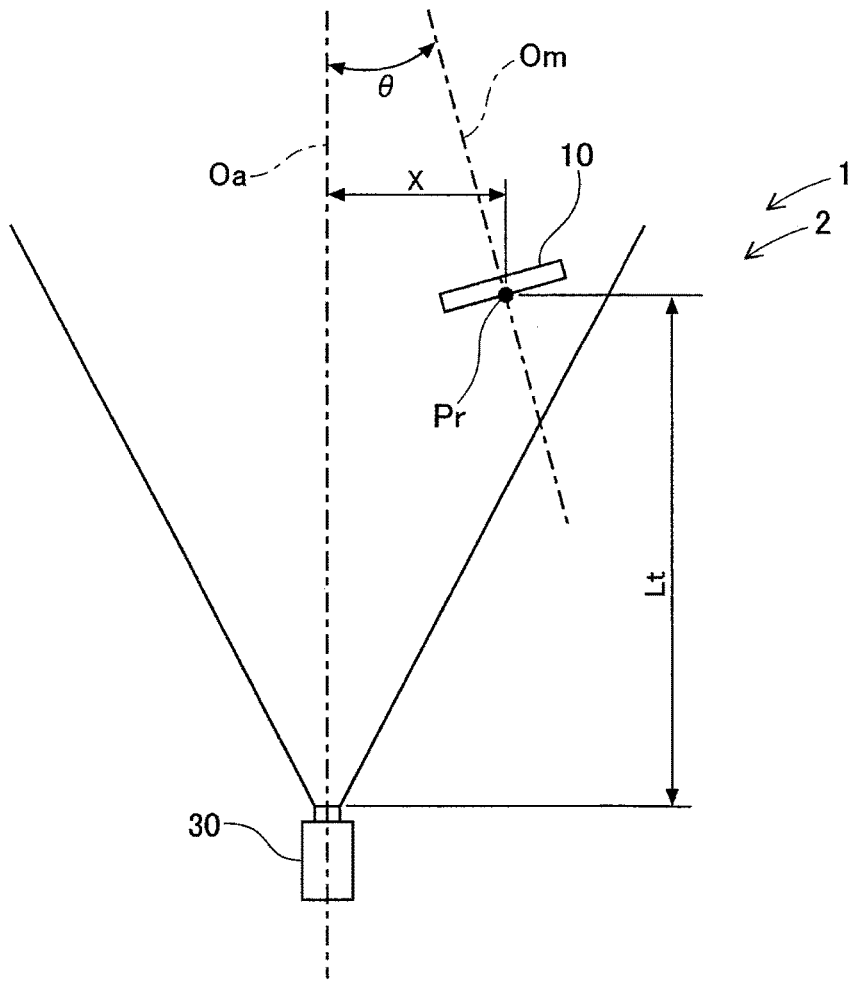
FIG. 3 is a plan view illustrating a state where the mark is imaged by a camera.
Figure 4:
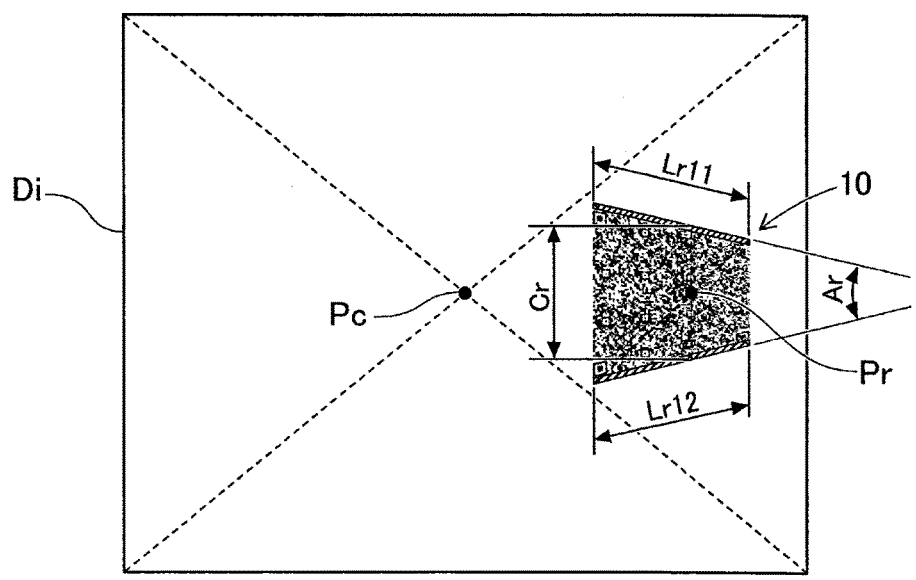
FIG. 4 is a diagram illustrating the mark in image data.

Subsequently, descriptions will be given regarding basic image processing of the image processing system 2 having the above-described configuration. The image processing system 2 images the mark 10 pasted on the assistance equipment 3 when the assistance apparatus 20 moves in response to a call of the person receiving assistance. Here, it is assumed that the mark and the camera 30 have the positional relationship illustrated in FIG. 3 and image data Di illustrated in FIG. 4 is acquired through image capturing.

In the image processing system 2, the optical information presented in the two-dimensional code 12 of the mark 10 in the image data Di is acquired first by the information acquisition unit 41, and is stored in the memory unit of the control device 40. Here, if the information acquisition unit 41 cannot recognize a portion of the two-dimensional code 12 when acquiring the optical information, reading processing of the two-dimensional code 12 may be executed again by reflecting the positional information of the camera 30 acquired thereafter. As illustrated in FIG. 5, the optical information presented by the two-dimensional code 12 includes the regulation lengths Lp of the pair of fiducial lines 11a and 11b, the regulation angle Ap, clearance Cl, the control information of the assistance apparatus 20 with respect to the mark 10, personal information (personal ID, height, weight, and the like) specifying the person receiving assistance, and aid information (contents of aid, aid history, and the like) related to aid.

The control information of the assistance apparatus 20 includes a movement path and a movement speed of the assistance apparatus 20 with respect to the mark 10. The control information related to the movement path indicates a posture of the assistance apparatus 20 which has moved close to the person receiving assistance, for example. The control information related to the movement speed indicates the movement speed of the assistance apparatus 20 in stages in accordance with a distance between the mark 10 and the assistance apparatus 20, for example. Then, the movement control unit 44 controls the movement of the assistance apparatus 20 so as to appropriately adjust the orientation of the assistance apparatus 20 with respect to the person receiving assistance, based on the control information while causing the movement speed of the assistance apparatus 20 to vary in accordance with the distance.

Subsequently, in the image processing system 2, the distance calculation unit 42 calculates a distance Lt from the camera 30 to the mark 10 in the optical axis direction. Therefore, the distance calculation unit 42 first acquires the regulation length Lp and clearance Cl included in the optical information which is read by the information acquisition unit 41. Then, the distance calculation unit 42 measures apparent lengths Lr11 and Lr12 of the pair of fiducial lines 11a and 11b in the image data Di. Moreover, in the present embodiment, the distance calculation unit 42 measures apparent clearance Cr between the pair of fiducial lines 11a and 11b.

Here, the apparent clearance Cr denotes clearance of the pair of fiducial lines 11a and 11b in the image data Di. For example, the apparent clearance Cr is measured as a length of the shortest segment passing through the fiducial position Pr of the mark 10 which is deduced from the image data Di and connecting the pair of fiducial lines 11a and 11b. Then, the distance calculation unit 42 calculates each of the differences between the acquired regulation lengths Lp and the apparent lengths Lr11 and Lr12, and a difference between the acquired clearance Cl and the measured apparent clearance Cr. Moreover, the distance calculation unit 42 calculates the distance Lt from the camera 30 to the mark 10 in the optical axis direction by using the map showing a relationship between each of the differences and the distance Lt in the optical axis direction.

In the image processing system 2, the distance calculation unit 42 calculates the shift amount X of the camera 30 with respect to the mark 10. In detail, the distance calculation unit 42 first calculates a difference between the fiducial position Pr of the mark 10 deduced from the image data Di and the center position Pc of the image data Di. Then, the distance calculation unit 42 calculates the shift amount X corresponding to the relative distance from the camera 30 to the mark 10 in a direction orthogonal to the optical axis by using the map showing a relationship between the difference and the shift amount X.

Continuously, in the image processing system 2, the angle calculation unit 43 calculates a tilt angle $\theta$ of the camera 30 with respect to the mark 10. Here, in order to simplify the descriptions, as illustrated in FIG. 3, the tilt angle $\theta$ is caused to be a tilt of the camera 30 in the horizontal direction with respect to the mark 10. In more detail, the tilt angle θ has an axis which passes through the fiducial position Pr and is perpendicular to the mark 10 as a mark axis Om. The tilt angle θ corresponds to an angle formed by the mark axis Om and the optical axis Oa of the camera 30.

When calculating the tilt angle θ, the angle calculation unit 43 first acquires the regulation angle Ap which is included in the optical information read by the information acquisition unit 41. Moreover, the angle calculation unit 43 measures an apparent angle Ar of the pair of fiducial lines 11a and 11b in the image data Di. Then, the angle calculation unit 43 calculates the tilt angle θ of the camera 30 with respect to the mark 10 by using the map showing a relationship between a difference between the regulation angle Ap and the apparent angle Ar and the tilt angle θ. In this case, the apparent angle Ar may be corrected in consideration of the calculated distance Lt from the camera 30 in the optical axis direction or the shift amount X.

When calculating the tilt angle θ, the angle calculation unit 43 may recognize an array direction of the plurality of unit cells 12a in the two-dimensional code 12 so as to recognize the extending direction of the pair of fiducial lines 11a and 11b. For example, there is a case where the pair of fiducial lines 11a and 11b in the image data Di become uncertain depending on the distance Lt between the mark 10 and the camera in the optical axis direction or imaging environment. Therefore, the angle calculation unit 43 may determine whether or not the currently recognized extending direction of the pair of fiducial lines 11a and 11b is correct by utilizing the circumstances of the present embodiment in which the plurality of unit cells 12a are arrayed along the fiducial line 11a (11b). In the case thereof, standards (the number of columns, the number of rows, positional symbols, and the like) and the like of the two-dimensional code 12 may need to be subjected to consideration.

In this manner, based on the image data Di acquired through image capturing performed by the camera 30, the image processing system 2 is configured to acquire the optical information of the two-dimensional code 12 and to acquire the positional information of the camera 30 with respect to the mark 10 (the distance Lt in the optical axis direction, the shift amount X, and the tilt angle θ). Then, the movement of the assistance apparatus 20 is controlled by the control device based on the optical information and the positional information. The above-described image processing may be executed every time the assistance apparatus 20 moves a predetermined distance or every predetermined period of time.

Effect of Configuration of Embodiment

According to the above-described image processing system 2, the distance calculation unit 42 calculates the distance Lt from the camera 30 to the mark 10 in the optical axis direction, and the angle calculation unit 43 calculates the tilt angle θ of the camera 30 with respect to the mark 10. Accordingly, without installing a sensor device or a light projection device for measuring a distance to the mark 10, it is possible to acquire the optical information presented in the two-dimensional code 12 of the mark 10 and to acquire the positional information of the camera 30 with respect to the mark 10. The information acquisition unit 41 can improve recognition accuracy of the mark 10 by reflecting the positional relationship between the mark 10 and the camera 30 in recognition processing of the mark 10.

In the image processing system 2, the distance calculation unit 42 is configured to calculate the shift amount X of the camera 30 with respect to the mark 10. Accordingly, in the image processing system 2, it is possible to acquire the information related to a position of the camera 30 with respect to the mark 10 based on the shift amount X of the camera 30 (the relative distance from the camera 30 in the direction orthogonal to the optical axis). In the image processing system 2, it is possible to obtain a distance in a straight line between the camera 30 and the mark 10 based on the shift amount X and the distance Lt in the optical axis direction.

In the present embodiment, the optical information of the two-dimensional code 12 includes the regulation lengths Lp of the pair of fiducial lines 11a and 11b and the regulation angle Ap. Accordingly, in the image processing system 2, coping with a case where the regulation length Lp and the regulation angle Ap are not stored in advance, it is possible to improve the versatility of the system.

The information display portion of the mark 10 is configured with the two-dimensional code 12. Accordingly, in the mark 10, it is possible to increase storable information content compared to a code configured by a bar code, a character string, and the like. In the present embodiment, since the two-dimensional code 12 presents the information related to the mark 10 (the regulation length Lp, the regulation angle Ap, and the like), the information content to be stored increases as much thereof. Therefore, it is particularly useful to apply the two-dimensional code 12 as the information display portion.

The plurality of unit cells 12a of the two-dimensional code 12 are arrayed in the extending direction of the pair of fiducial lines 11a and 11b which are arranged in a parallel manner. Accordingly, in the image processing system 2, it is possible to recognize the extending direction of the pair of fiducial lines 11a and 11b by recognizing the array direction of the plurality of unit cells 12a. Therefore, in the image processing system 2, it is possible to favorably acquire the positional information between the mark 10 and the camera 30 by improving the accuracy of image processing performed by the distance calculation unit 42 and the angle calculation unit 43.

In the present embodiment, the movement control unit 44 is configured to control the movement of the assistance apparatus 20 which is the mobile body, based on the control information acquired by the information acquisition unit 41. Accordingly, the movement control unit 44 can perform favorable movement controlling in at least any one of the movement path and the movement speed in consideration of the positional information of the camera 30 with respect to the mark 10 (the distance Lt in the optical axis direction, the shift amount X, the tilt angle θ, and the like). Since the movement control unit 44 can perform movement controlling in accordance with the positional information and the control information of the camera 30 presented in the mark 10, it is possible to improve the versatility of the image processing system 2.

In the present embodiment, a configuration in which the image processing system 2 is applied to the assistance system 1 is exemplified. According to such a configuration, if the camera 30 is moved with respect to the mark 10 in accordance with the movement of the assistance apparatus 20, it is possible to acquire at least any one of the personal information and the aid information of the person receiving assistance by the information acquisition unit 41 in addition to the positional information of the camera 30 with respect to the mark 10. The assistance apparatus 20 can move close to the person receiving assistance while appropriately adjusting the posture and the speed by performing movement controlling in response to a state or a demand of the person receiving assistance. In this manner, it is particularly useful to cause the assistance system 1 to be applied with the image processing system 2 in which the positional information of the camera 30, the personal information of the person receiving assistance, and the like can be acquired.

Modification Form of Embodiment

Figure 6:
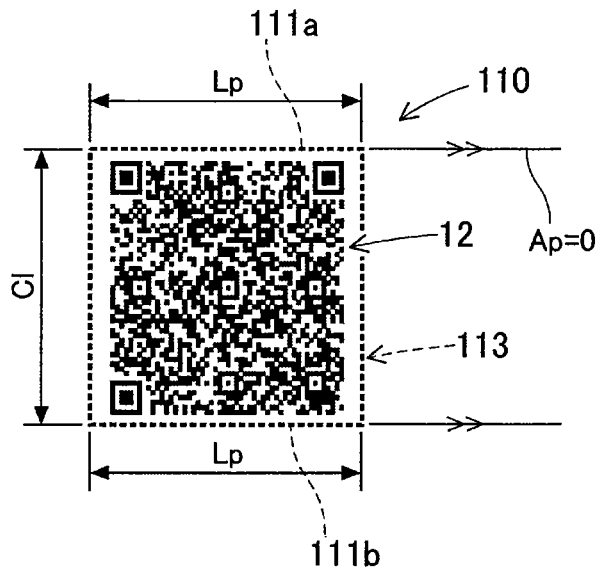
FIG. 6 is a plan view illustrating the mark in a modification form of the embodiment.

In the present embodiment, the mark 10 includes the pair of fiducial lines 11a and 11b which are vertically arranged (the vertical direction in FIG. 2) in the two-dimensional code 12. In contrast, a portion of the outer frame provided for the mark may be configured to be the pair of fiducial lines. Specifically, as illustrated in FIG. 6, for example, a mark 110 includes an outer frame 113 surrounding the outer periphery of the two-dimensional code 12. Then, the control device 40 regards a portion or the entirety of a plurality of sides configuring the outer frame 113 as at least a pair of fiducial lines 111a and 111b, and thus, it is possible to execute image processing and operation controlling exemplified in the present embodiment.

Figure 7:
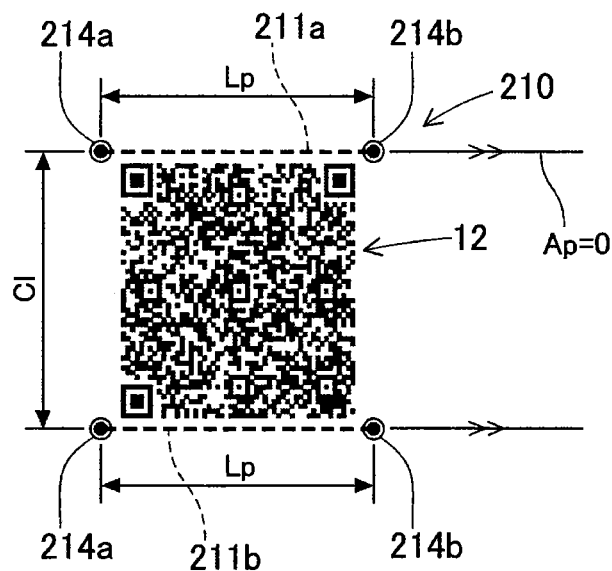
FIG. 7 is a plan view illustrating the mark in another modification form of the embodiment.

Furthermore, at least a pair of fiducial lines may be virtually configured by using four or more fiducial points applied to the mark. Specifically, as illustrated in FIG. 7, for example, a mark 210 includes four specifically shaped fiducial points 214a to 214d which are respectively arranged at the corners of the two-dimensional code 12 on the outer periphery side. The four fiducial points 214a to 214d are not necessarily on the same plane, but three arbitrary points are arranged so as not to be on the same straight line. Then, the control device 40 virtually configures a pair of fiducial lines 211a and 211b by connecting the fiducial points 214a to 214d, and thus, it is possible to execute image processing and operation controlling exemplified in the present embodiment.

In the present embodiment, the information display portion of the mark 10 is the two-dimensional code 12. In contrast, the mark 10 may be a bar code presenting optical information; a character string, a pattern, or a color directly presenting information; or a combination thereof. However, when increasing the storable information content and performing correction of an error and the like, it is favorable to configure the information display portion to be the two-dimensional code 12 as exemplified in the present embodiment.

In the present embodiment, the image processing system 2 is applied to the assistance system 1. In contrast, the image processing system 2 can be applied to a reader which copes with various codes while having a code including the pair of fiducial lines and the information display portion as a target of reading processing. In such a case, it is possible to obtain an effect similar to that of the present embodiment by acquiring the positional information of the camera with respect to the mark.

When calculating the tilt angle θ, the angle calculation unit 43 uses the map showing the relationship between the difference between the regulation angle Ap and the apparent angle Ar and the tilt angle θ. In contrast, for example, the angle calculation unit 43 may similarly calculate the tilt angle θ by referring to a plurality of patterns stored in advance. The angle calculation unit 43 may calculate a tilt in the vertical direction or the turning angle about the optical axis Oa in the same manner in addition to a tilt of the camera 30 in the horizontal direction with respect to the mark 10.

REFERENCE SIGNS LIST

1: ASSISTANCE SYSTEM, 2: IMAGE PROCESSING SYSTEM, 3: ASSISTANCE EQUIPMENT
10, 110, 210: MARK
11a, 11b: PAIR OF FIDUCIAL LINES
111a, 111b, 211a, 211b: PAIR OF FIDUCIAL LINES
12: TWO-DIMENSIONAL CODE (INFORMATION DISPLAY PORTION), 12a: PLURALITY OF UNIT CELLS
113: OUTER FRAME, 214a TO 214d: FIDUCIAL POINT
20: ASSISTANCE APPARATUS (MOBILE BODY)
30: CAMERA
40: CONTROL DEVICE
41: INFORMATION ACQUISITION UNIT, 42: DISTANCE CALCULATION UNIT, 43: ANGLE CALCULATION UNIT
44: MOVEMENT CONTROL UNIT
Lp: REGULATION LENGTH, Ap: REGULATION ANGLE, Cl: CLEARANCE
Lr11, Lr12: APPARENT LENGTH, Ar: APPARENT ANGLE
Cr: APPARENT CLEARANCE, Oa: OPTICAL AXIS, Om: MARK AXIS
Lt: DISTANCE IN OPTICAL AXIS DIRECTION, X: SHIFT AMOUNT, θ: TILT ANGLE
Pr: FIDUCIAL POSITION, Pc: CENTER POSITION, Di: IMAGE DATA
FIG. 1
41: INFORMATION ACQUISITION UNIT
42: DISTANCE CALCULATION UNIT
43: ANGLE CALCULATION UNIT
44: MOVEMENT CONTROL UNIT
FIG. 5
MARK INFORMATION
REGULATION LENGTHS Lp
REGULATION ANGLE Ap
CLEARANCE
PERSONAL INFORMATION
ID
HEIGHT
WEIGHT
CONTROL INFORMATION
MOVEMENT PATH
APPROACHING SPEED 1
APPROACHING SPEED 2
AID INFORMATION
METHOD OF AID
AID HISTORY

The invention claimed is:

1. An assistance system, comprising:
an image processing system, comprising:
a mark in which at least a pair of fiducial lines set to regulation lengths are arranged in a parallel manner or at a predetermined angle so as to form a regulation angle, or four or more fiducial points not on the same straight line virtually configuring the pair of fiducial lines are arranged, and an information display portion presenting predetermined information is included in a region formed by the pair of fiducial lines;
a camera that is relatively movable with respect to the mark;

an information acquisition unit that acquires image data of the mark through image capturing performed by the camera and acquires the information presented in the information display portion of the mark, out of the image data;

a distance calculation unit that calculates a distance from the camera to the mark in an optical axis direction based on the regulation lengths of the pair of fiducial lines and apparent lengths of the pair of fiducial lines in the image data;

an angle calculation unit that calculates a tilt angle of the camera with respect to the mark based on the regulation angle of the pair of fiducial lines and an apparent angle formed by the pair of fiducial lines in the image data;

a mobile body that is provided with the camera and is movable with respect to the mark; and a movement control unit that controls a movement of the mobile body, wherein the information of the information display portion includes control information related to at least one of a movement path and a movement speed of the mobile body with respect to the mark, wherein the movement control unit controls movement of the mobile body based on the control information acquired by the information acquisition unit, wherein the mobile body configures an assistance apparatus which aids motion of an person receiving assistance, and wherein the information of the information display portion includes at least one item of personal information which specifies the person receiving assistance and aid information which is related to the aid.

2. The assistance system according to claim 1,
wherein the distance calculation unit calculates a shift amount of the camera with respect to the mark based on a difference between a fiducial position of the mark deduced from the pair of fiducial lines in the image data, and a center position of the image data.

3. The assistance system according to claim 2,
wherein the information presented by the information display portion includes the regulation lengths and the regulation angle of the pair of fiducial lines,
wherein the distance calculation unit calculates the distance in the optical axis direction or the shift amount by using the regulation lengths acquired by the information acquisition unit, and
wherein the angle calculation unit calculates the tilt angle by using the regulation angle acquired by the information acquisition unit.

4. The assistance system according to claim 3,
wherein the information display portion of the mark is configured with a two-dimensional code in which a plurality of unit cells are arrayed in a matrix shape along the fiducial line.

5. The assistance system according to claim 4,
wherein in the mark, the pair of fiducial lines are arranged in a parallel manner and the plurality of unit cells are arrayed over a plurality of columns in an extending direction of the fiducial line.

* * * * *